United States Patent [19]

Yang

[11] 4,204,241
[45] May 20, 1980

[54] LOW POWER CONSUMPTION RELAY SWITCHING CIRCUIT FOR USE IN CONJUNCTION WITH A LINE TEST TRUNK INTERFACING TO A TEST DESK

[75] Inventor: Huan-Tong Yang, Elmhurst, Ill.

[73] Assignee: GTE Automatic Electric Laboratories Incorporated, Northlake, Ill.

[21] Appl. No.: 972,747

[22] Filed: Dec. 26, 1978

[51] Int. Cl.² ............................................. H04M 3/22
[52] U.S. Cl. ................................. 361/154; 361/187; 361/194; 179/175
[58] Field of Search ............... 361/154, 187, 194; 179/175, 175.3 R

[56] References Cited

U.S. PATENT DOCUMENTS

| | | | |
|---|---|---|---|
| 3,875,351 | 4/1975 | Kennedy | 179/175.3 R |
| 3,928,735 | 12/1975 | Kennedy | 179/175 X |
| 3,951,248 | 4/1976 | Feiner et al. | 179/175 X |
| 4,017,696 | 4/1977 | Falk | 179/175 |

*Primary Examiner*—Harry E. Moose, Jr.
*Assistant Examiner*—L. C. Schroeder
*Attorney, Agent, or Firm*—Robert J. Black; Frank J. Bogacz

[57] ABSTRACT

An improved circuit for interfacing between a test desk, a subscriber line and an electronic switching center is disclosed herein. The disclosed improvements allow the relay circuit to operate in response to a predetermined threshold current value while requiring only a minimal current flow and thereby providing the capability to use components lower rated in terms of power consumption.

4 Claims, 4 Drawing Figures

LOW POWER CONSUMPTION RELAY SWITCHING CIRCUIT FOR USE IN CONJUNCTION WITH A LINE TEST TRUNK INTERFACING TO A TEST DESK

BACKGROUND OF THE INVENTION

1. Field of the Invention

The present invention relates to a line test trunk interface circuit connected between a test desk and an electronic switching center and more particularly to improvements to said circuit providing for low power consumption via the use of low power rated components while maintaining the integrity of the operation of the line test trunk circuit and preventing false operation of the circuit.

(2) Description of the Prior Art

When testing central office equipment associated with a subscriber line to verify such problems as lack of dial tone, wrong number on called origination, etc., a test desk facility is utilizied to perform functional testing of the equipment. Various equipment associated with a subscriber line connected to electronic switching center can be routined by a craftsman at a centrally located test desk. A test desk facility is interfaced with an electronic switching center via a circuit called a line test trunk which is similar to an incoming trunk circuit with additional testing cability. The functions and connections of one such test desk is shown in an article contained in the GTE Automatic Electric Technical Journal by Daniel J. Mazzola entitled "NO. 1 EAX in Taiwan", Vol. 15-No. 9, September, 1977, p. 378.

A line test trunk circuit connects a test desk to a trunk matrix and a selector matrix of an electronic switching center. In addition, supervisory signals are supplied to the central processing unit of an electronic switching center via a maintenance and control center. The electronic switching center referred to above is described in U.S. Pat. No. 3,835,260, "Communication Switching System with Marker, Register and Other Subsystems Cordinated by a Stored Program Central Processor", issued on Sept. 10, 1974, to K. E. Prescher et al. The functions and interface connections of the Maintenance and Control Center as mention above are described in GTE Automatic Electric Technical Journal, in an article entitled "NO. 1 EAX (Electronic Automatic Exchange) Maintenance and Control Center", by T. W. Crosley, et al, Vol. 13-No. 4, October, 1972, p. 163.

Referring to prior art FIG. 2, the test desk connection to the line test trunk circuit via a cable is shown. When relay K4 operates a supervisory signal is transmitted to the central processing unit of the electronic switching center via the maintenance and control center not shown. It is intended that the operation of relay K4 be a function of the operation of switch BCO by the craftsman. Contact K10 is operated via a relay not shown. When the craftsman inserts a test cord into a jack contained on the test desk current flows from the −50 volt supply through resistor R3, switch BCO, via lead S over cable (shown as resistance RC), break contact K4', relay K4, make contact K10 to ground. The circuit in this state depicts the original interface provided by the line test trunk to the test desk facility. During operation of the above-mentioned electronic switching center in Taiwan, it was found that relay K4 was operating in response to the insertion of the test cord into the jack located on the test desk. This operation of relay K4 caused false indication to the central processing unit associated with the switching center.

One solution to this problem was proposed as shown in prior art FIG. 3. A resistor R23 is connected in parallel with relay K4 and to the common connection of resistor R13 and break contact K4'. The operate and hold currents for relay K4 are fixed at 17.4 ma and 9.0 ma, respectively. The value of shunting resistor R23 was determined to be 249 ohms at 5 watts requiring a flameproof resistor. In order to maintain the holding current of 9.0 ma resistor R13 was required to be changed from 825 ohms at 1 watt to 300 ohms at 5 watts. This results in a high current drain of 125.2 ma and excessive power consumption of 2.76 watts by resistor R23.

Therefore, it is an object at the present invention to provide a low power consumption circuit for interfacing a test desk to an electronic switching system. In addition, it is an object of the present invention to eliminate false operation of said relay providing a false signal to the switching system requesting that a path be established between the line to be tested and the common control switching equipment of the switching center. Furthermore, it is an object of the present invention to provide the above mentioned objectives without altering the test desk or other common control equipment included in the switching center.

SUMMARY OF THE INVENTION

The present invention consists of improvements to the aforementioned circuit set forth in the description of the prior art. The improvements are included in the line test trunk circuit. A test desk providing supervisory signals is connected to the line test trunk circuit via a cable. A relay forms the heart of the signalling function of the line test trunk circuit. A first resistor is connected between the cable and said relay. A break contact of this relay is connected in parallel with said first resistor. A diode is connected between said first resistor and said break contact of said relay. The anode of the diode is connected to the common connection of the first resistor and the relay; the cathode of this diode is connected to the break contact of said relay. A second resistor is shunt connected with the relay to the common connection of the break contact of the relay and the diode and the second resistor is further connected to ground through a make contact of a relay not shown.

When a test cord is inserted into the jack corresponding to a particular line test trunk circuit, current flows from a −50 volt source via a cable to the line test trunk. At the line test trunk, current flows through the break contact of a corresponding relay and the current divides flowing through the associated relay and through a second resistor, through the make contact of another relay to ground. The current thereby flowing through the relay is not of sufficient magnitude to operate the relay. Therefore, the problem of false operation of the relay in response to the insertion of the test cord into the jack is eliminated.

When a switch at the test desk is operated, a substantially lower resistance is connected at the test desk and current flows from the −50 volt source via this resistor over the associated cable to the line test trunk circuit. Again the current flows via the break contact and divides between the second resistor and the relay, flowing to ground through a make contact of another relay. Due to the lower resistance inserted into the circuit at the test desk, the current thereby flowing is sufficient to operate the relay in the line test trunk circuit. After the operation of the relay, its associated break contact is an open circuit. Current flows from the −50 volt source at the test desk via the low resistance connected at the test desk over the cable to the line test trunk. At the line test trunk, current flows via the first resistor, the relay and a make contact to ground. No current flows through the second resistor due to the fact that the diode is now reverse biased. Therefore, the first resistor may be of a higher resistance and substantially lower power consumption than shown by the prior art. No current flows and hence no power is consumed by the second resistor during the operation of the relay. In addition, the current drain of the circuit is reduced to one-fourth of its original value.

Because of the placement of the diode in the circuit, the diode also functions to suppress the electromotive force surge for the relay in this circuit. Therefore, the improvements to the circuit provide several enhanced functions with a minimum of components. The components utilized are of low power consumption and therefore economical in nature.

DESCRIPTION OF THE PREFERRED EMBODIMENT

Figure 1:
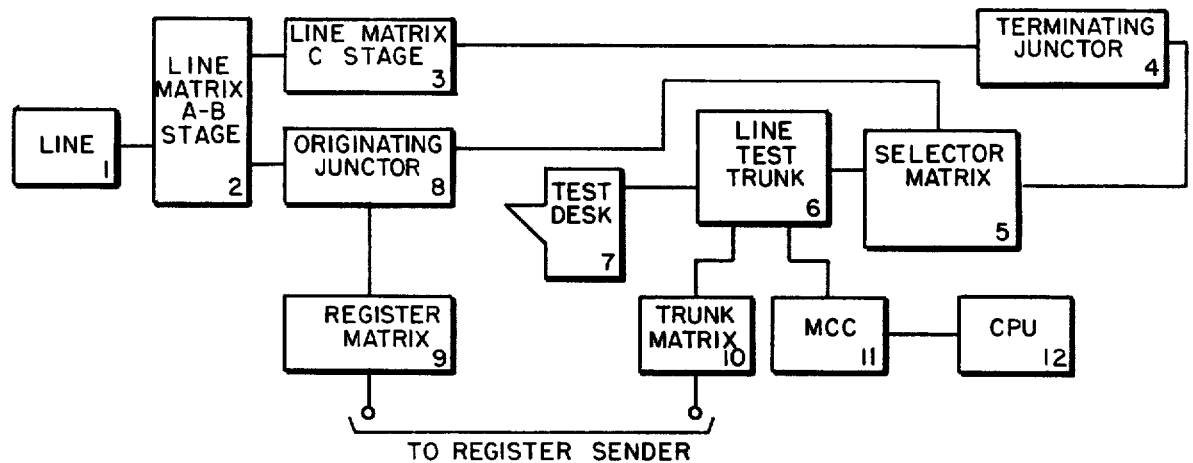
FIG. 1 is a block diagram depicting the interconnections between a line test trunk of which the present invention is a portion thereof and an electronic switching system and associated test desk.
Figure 2:
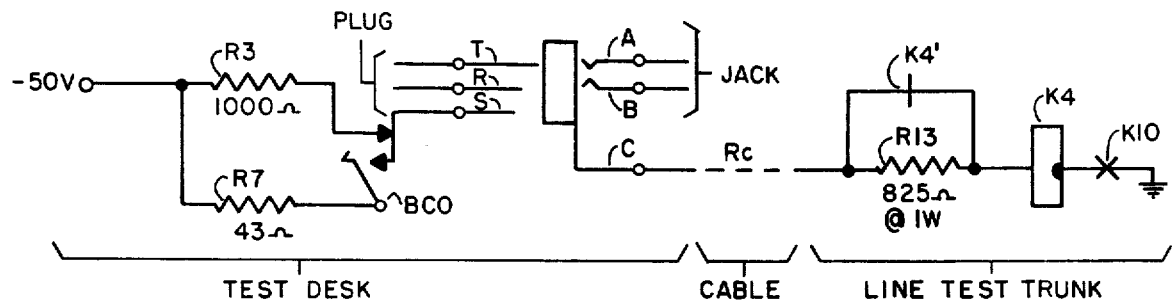
FIG. 2 is a schematic diagram representing an embodiment of the prior art.

Referring to FIG. 1, when a craftsman at the test desk 7 seizes the line test trunk 6 a call for service is transmitted to the switching system. The switching system connects the line test trunk 6 to the register sender via the trunk matrix 10. Then the craftsman enters the identity of a line 1 to be tested. The connection between the line 1 and the line test trunk 6 is established via a path from the line 1 through the line matrix A-B stage 2, through the line matrix C stage 3, the terminating junctor 4, the selector matrix 5 to the line test trunk 6. The line test trunk 6 has the capability to verify that faults exists such as "no-dial-tone-present" at the calling line or "wrong-number" obtained on a call origination, etc.

Next, the craftsman at the test desk 7 initates the request to the electronic switching system to perform the required tests. Upon activation, a relay located in the line test trunk 6 is operated. This relay causes an interrupt to be transmitted to the central processing unit (CPU) 12 via the maintenance and control center (MCC) 11. As a result, the electronic switching system establishes a path between the line 1 and the register sender via line matrix A-B stage 2, orignating junctor 8 and register matrix 9. At this time, a loop connection has been established and the craftsman may instruct the electronic switching system to perform the various fault analysis required.

Figure 4:
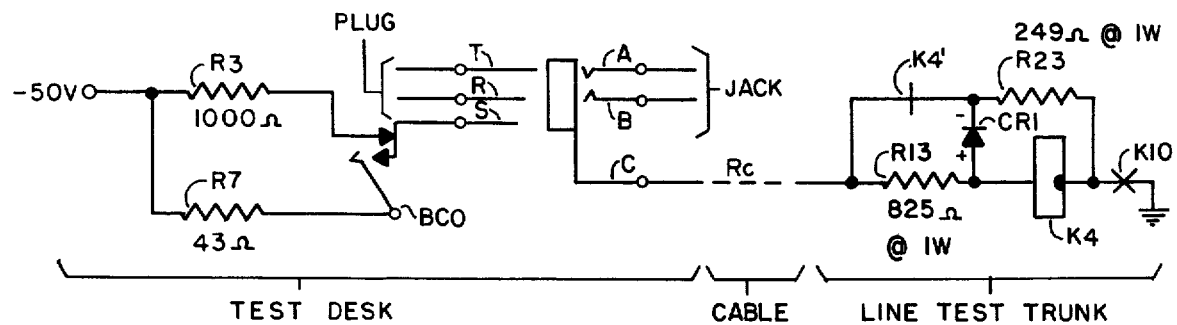
FIG. 4 is a schematic diagram of a circuit embodying the principles of operation of the present invention.

Referring to FIG. 4, the interconnection between the test desk and the line test trunk via a cable is shown. A −50 volt source is connected to resistors R3 and R7 through switch BCO via a plugjack assembly and over a cable to the line test trunk. At the line test trunk resistor R13 is connected between the incoming cable and relay K4. Relay K4 is connected between resistor R13 and ground via a make contact K10 of an associated relay (not shown). A break contact K4' of associated relay K4 is connected in shunt with resistor R13 via diode CR1. Resistor R23 is connected in shunt with relay K4 via diode CR1 so that there is a common connection of break contact K4' resistor R23 and the cathode of diode CR1.

When a test cord plug is inserted into the corresponding jack of a particular line test trunk circuit current flows from the −50 volt source via the plug-jack assembly over the cable to the line test trunk. At the line test trunk, current flows through the break contact K4', through resistor R23 (249 ohms at 1 watt), to ground through make contact K10. Current also flows through relay K4 and the magnitude of this current is 9.5 ma which is not sufficient to operate relay K4. Therefore, false operation of relay K4 due to the insertion of the plug into the jack at the test desk had been prevented.

When a craftsman operates the switch BCO current flows from the −50 volt source through resistor R7 (43 ohms) through the switch BCO via the plug-jack assembly and cable to the line test trunk. This current flows through break contact K4', R23 to ground and in parallel through relay K4 to ground through make contact K10. The magnitude of the current through relay K4 is 18.6 ma which is sufficient to operate relay K4. After the operation of relay K4 break contact K4' is an open circuit. Now, current flows from the −50 volt source through resistor R7 via the plug-jack assembly and cable through resistor R13, relay K4, make contact K10 to ground. No current flows through resistor R23 due to the fact that diode CR1 is reversed biased. Therefore, it is unnecessary that resistor R13 be a low resistance high wattage resistor. Since there is no power consumption due to resistor R23 during operation of relay K4, a 1 watt flameproof resistor is adequate. This is contrasted with the requirement of a 5 watt flameproof resistor R23 as shown in FIG. 3 of the prior art.

Figure 3:
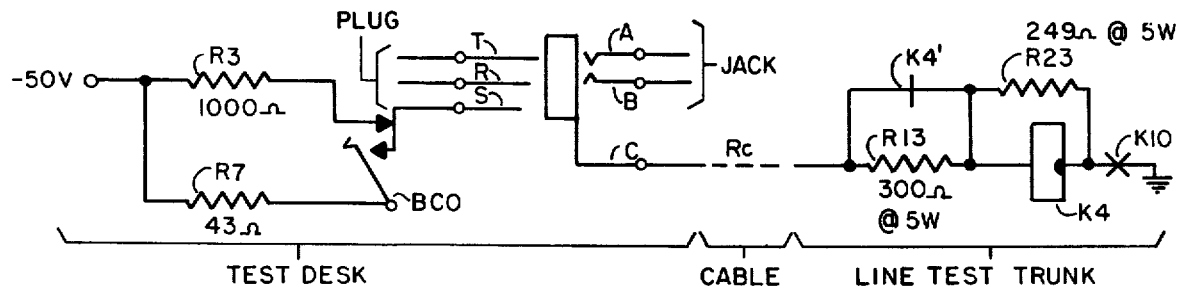
FIG. 3 is a schematic diagram representing a proposed modification to the prior art circuit of FIG. 2.

The resistor R13 of FIG. 3 of the prior art has a value of 300 ohms at 5 watts. In the present invention as shown in FIG. 4 the resistor R13 is of value 825 ohms at 1 watt, due to the low power requirement of this circuit. The resulting current drain during operation of relay K4 is also dramatically reduced from a value of 125.2 ma as shown in FIG. 3 to a value of 29.5 ma as shown in FIG. 4.

The addition of diode CR1 also provides for surpression of surges in the electromotive force for relay K4.

Although a preferred embodiment of the invention has been illustrated, and that form described in detail, it will be readily apparent to those skilled in the art that various modifications may be made therein without departing from the spirit of the invention or from the scope of appended claims.

What is clamed is:

1. A low power consumption relay switching circuit for use in a line test trunk interfacing between a test desk including a voltage source initially operated at a first voltage level and further operable at a second voltage level, and an electronic switching center, said switching circuit including a relay comprising a coil and an associated break contact connected to said voltage source, the improvement comprising:
current direction means connected between said relay coil and said break contact and operated to conduct voltage from said voltage source to said relay coil;

first resistive means connected between said voltage source and said relay;

second resistive means connected to said voltage source through said break contact and connected in shunt with said relay coil, operated to inhibit operation of said relay by limiting current flow through said relay coil;

said relay operated in response to said second voltage level of said voltage source to disconnect said second resistive means from said voltage source;

said first resistive means operated in response to said relay operation to limit current flow through said relay coil; and said current direction means further operated in response to said relay operation to block current flow from said voltage source to said second resistive means.

2. A low power consumption relay switching circuit as claimed in claim 1, wherein: said current direction means includes a diode having its anode connected to the common connection of said first resistive means and said relay and having its cathode connected to the common connection of said break contact of said relay and said second resistive means whereby current flow through said second resistive means is presented for said relay operation, thereby reducing power consumption of said circuit and said diode further suppressing surges of electromotive force to said relay.

3. A low power consumption relay switching circuit as claimed in claim 1, wherein: said first resistive means consists of a resistor of 800 to 900 ohms at approximately 1 watt of power consumption.

4. A low power consumption relay switching circuit as claimed in claim 1, wherein: said second resistive means consists of a resistor of 225 to 250 ohms at approximately 1 watt of power consumption.

* * * * *